US005158000A

United States Patent [19]

Samejima et al.

[11] Patent Number: 5,158,000

[45] Date of Patent: Oct. 27, 1992

[54] TWO-SHAFT METHOD FOR SLICING A CYLINDRICAL ELASTIC BODY INTO RINGS AND ITS APPARATUS

[75] Inventors: Hisashi Samejima; Fumiya Yamamoto, both of Kobe, Japan

[73] Assignee: Bando Kagaku Kabushiki Kaisha, Japan

[21] Appl. No.: 672,885

[22] Filed: Mar. 21, 1991

[30] Foreign Application Priority Data

Apr. 2, 1990 [JP] Japan .................................. 2-88973

[51] Int. Cl.[5] ......................... B26D 5/20; B29D 29/00

[52] U.S. Cl. ...................................... 83/76.8; 83/175; 83/935; 29/2.21

[58] Field of Search .................. 83/18, 175, 178, 935, 83/187, 76.8; 29/2.21, 2.25, DIG. 73

[56] References Cited

U.S. PATENT DOCUMENTS 4,488,465 12/1984 Brand et al. .......................... 83/175
4,586,410 5/1986 Müller-Erwig et al. ............... 83/18
4,587,872 5/1986 Müller-Erwig ......................... 83/18

*Primary Examiner*—Hien H. Phan

*Attorney, Agent, or Firm*—Marshall, O'Toole, Gerstein, Murray & Bicknell

[57] ABSTRACT

This disclosure relates to a method for slicing a cylindrical elastic body, for example, a slab or broad belt prior to being cut into belts or rings of a certain width, by a two-shaft system, and its apparatus. The apparatus includes a) a drive shaft, of which the top end thereof can be released from its support, of which the root end thereof is connected to its drive unit, the drive shaft having a radially projecting part at the root end; b) a freely rotatable shaft extending in parallel with and at a constant distance from the drive shaft in a horizontal plane, of which the top end can be released from it support and can be tilted in vertical direction, and c) a cutting unit which has a cutter positioned perpendicular to the axial direction of the drive shaft, and which can move towards the drive shaft and can travel in the axial direction of the drive shaft. With the use of the above-mentioned apparatus, a cylindrical elastic body can be reliably and stably biased to one end of the two shafts supporting the elastic body, and slicing into rings of a desired width can be accomplished with high precision.

1 Claim, 8 Drawing Sheets

FIG. 7A
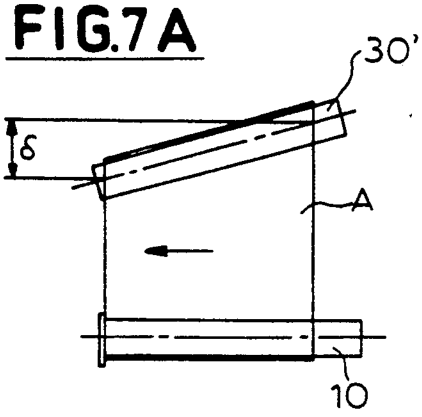
FIG. 7B
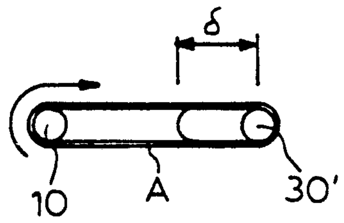
PRIOR ART
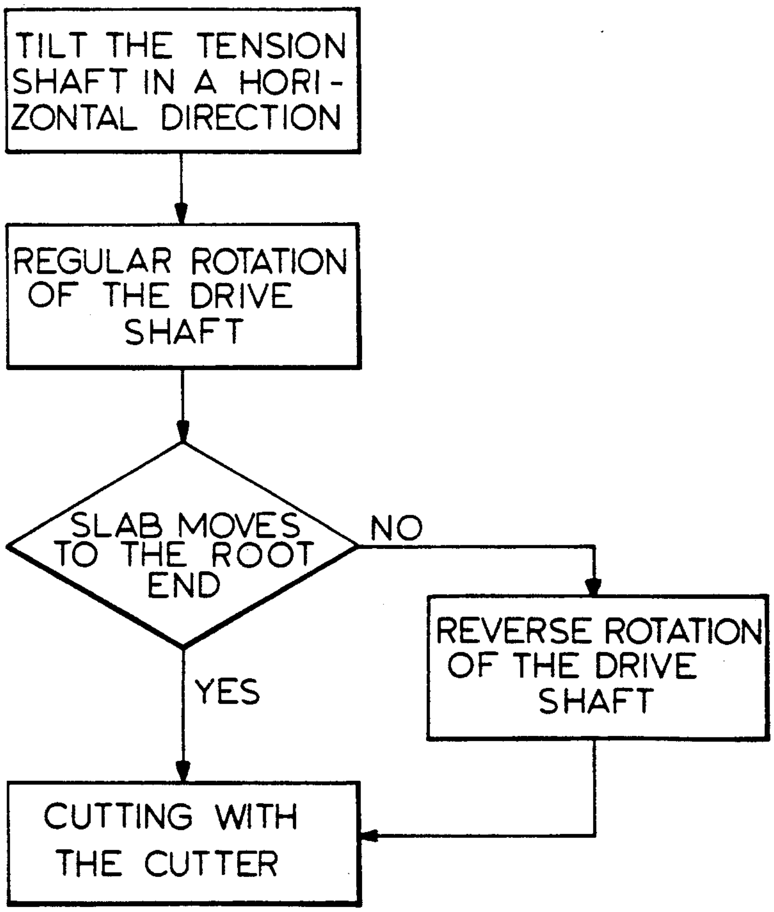
FIG. 8 PRIOR ART

TWO-SHAFT METHOD FOR SLICING A CYLINDRICAL ELASTIC BODY INTO RINGS AND ITS APPARATUS

FIELD AND BACKGROUND OF THE INVENTION

This invention relates to a method and apparatus for slicing a cylindrical elastic body, for example a broad belt, in order to divide it into narrower width belts and/or rings, the broad belt being hereinafter referred to as a slab.

A method for slicing a slab into rings by means of a two-shaft system is generally used in the prior art because a change in the internal size (bore) of the slab does not require a change of a shaft, and accordingly the time for resetting is short.

The following prior art method has been proposed for slicing a slab into belts of a certain width by means of the two-shaft system. According to this method, as shown in FIG. 7(*a*) and (*b*), a slab A is placed across a horizontal drive shaft 10 and a horizontal tension shaft 30' arranged in parallel and at a distance with each other. Then the top end (on the right-hand side of the drawing) of the tension shaft 30' is tilted in its horizontal plane to move the top end of the shaft 30' away from the drive shaft 10 and expand or stretch one end portion of the slab A. With the slab A being tensioned such as to tend to move towards the root ends (the left-hand side of the drawing) of both the shafts 10 and 30', the drive shaft 10 is turned to rotate the slab A in one direction so as to bias the slab A, due to the tension, towards the root ends of both the shafts 10 and 30'.

Thus, with the slab A being rotated and biased towards the root ends of both of the shafts 10 and 30', a cutter (not illustrated) is moved to cut into the slab A adjacent the drive shaft 10 to slice it into rings or belts of desired widths. The cutter is made to travel stepwise from the top (right) end side of the slab A towards the root end side thereof by a distance corresponding to the desired belt width to effect cutting. A slab A itself has an inherent tendency to bias or move due to the manner of laying of the cores, canvas and cords or some other causes. If such a biasing tendency is strong and the slab A does not move towards the root end, the direction of rotation of the drive shaft 10 is preferably changed. FIG. 8 is a flow chart showing the foregoing procedure of the conventional slicing method described above.

The aforementioned conventional method presents the following problems:

(1) The slab A is biased towards one end by expanding the slab A on one end side by means of the tension shaft 30', thus generating a tension in the slab A. If the tension is small, the effect of biasing the slab A will be small and cannot reliably bias the slab A towards the root ends of the drive shaft 10 and the tension shaft 30'.

Furthermore, even if a sufficient tension is generated to bias the slab A towards the root ends of both of the shafts 10 and 30', the tension in the slab A will be gradually reduced when the slab A is sliced stepwise at a constant interval from its top end side (which has a larger tension) to the root end side and the cutter approaches closer to the root end side. Thus the effect of biasing the slab A towards the root end side of both the shafts 10 and 30' will decrease, which in turn may cause a discrepancy between the starting point and finishing point of a slice; consequently a defective belt with stepped cutting (the termination of a cut is not aligned with the beginning of a cut) may be produced or the belt width may change.

When the slab A is biased under the influence of the tension caused by the tension shaft 30', although the slab A itself has a biasing tendency in the opposite direction (towards the top ends of said both shafts), the tension acting on the slab A will be reduced gradually as the slab A is sliced into rings at a constant interval by a cutter from the top end side of the slab A. Thus the balance of power might be lost suddenly and the slab A might shift towards the top end resulting in defective cutting.

(2) As described above, the top end side of the tension shaft 30' is tilted with respect to the drive shaft 10 in the horizontal plane to separate the tension shaft 30' away from the drive shaft 10, and in turn, apply a tension to the slab A. The greater the tilt angle of the tension shaft 30' with respect to the drive shaft 10, the greater will be the distance between the top end of the drive shaft 10 and the top end of the tension shaft 30'. When the difference (maximum inter-shaft distance $\delta$) between inter-shaft distances at both ends of the slab A exceeds a certain value, stepped (defective) slicing will happen. To be more specific, as shown by two graphs on the right side of FIG. 9, for slabs having a circumference of 132 mm or 63 mm, stepped slicing will occur when the maximum inter-shaft distance exceeds 1.0 mm. It, therefore, is necessary to set the maximum inter-shaft distance $\delta$ within 1 mm. This, however, tends to cause the problem described in (1) above since the biasing effect is small. As shown in FIG. 9, the biasing distance corresponding to rotation for a fixed time (15 seconds) is as very small as about 6 mm. FIGS. 11(*a*) and (*b*) are graphs showing the relationship between the tilt angle $\theta$ of the tension shaft 30' and the biasing distance (towards the root end) after rotation for a fixed time (15 seconds) for five kinds of slabs of which the circumference ranges from 68 to 132 mm.

(3) From the viewpoint of belt quality, it is not desirable to produce a large tension in the slab.

SUMMARY OF THE INVENTION

The present invention was made in view of the aforementioned points and provides a method that stably and reliably biases a cylindrical elastic body such as a slab supported across two shafts towards one end side of the two shafts and allows slicing of the body into rings of desired widths with high accuracy, and an apparatus for carrying out such a method.

The method according to the present invention comprises the steps of a) placing a cylindrical elastic body or slab across a drive shaft and a freely rotatable shaft which extend in parallel with each other at a constant distance, said body being placed in an approximately intermediate position between the ends of both shafts, b) rotating the drive shaft in a specified direction and detecting the direction of movement of the cylindrical elastic body along the drive shaft, c) deciding the direction of rotation of the drive shaft according to said direction of movement and deciding the direction to which the top end of the freely rotatable shaft must be tilted out of the plane defined by the freely rotatable shaft and the drive shaft, d) rotating the drive shaft in the direction determined as described above while maintaining the top end of the freely rotatable shaft tilted in the direction determined as described above so as to bias the cylindrical elastic body towards the root ends of said two shafts, and to cut the body sequentially at desired intervals from the top end side towards the root end side.

To practice the aforementioned method, the apparatus according to the present invention is provided with a) a drive shaft, of which the top end can be released from its support and of which the root end is connected to its drive unit, said drive shaft having a radially projecting part at the root end, b) a freely rotatable shaft running in parallel with and at a constant distance from said drive shaft in a horizontal plane, of which top end can be released from its support and can be tilted in vertical direction, and c) a cutting unit which has a cutter positioned perpendicular to the axial direction of the drive shaft, which can move towards the drive shaft and can travel in the axial direction of the drive shaft.

According to the aforementioned method for slicing a cylindrical elastic body into rings or its apparatus of the present invention, (1) a cylindrical elastic body is supported across two parallel shafts, then (2) the drive shaft is turned clockwise as seen in the direction from the top end of the drive shaft towards the root end thereof (hereinafter referred to as the regular rotation) to detect the direction of movement (biasing tendency) of the cylindrical elastic body on the two shafts, and (3) an optimal tilting direction of the freely rotatable shaft out of the plane defined by the drive shaft and the freely rotatable shaft and an optimal direction of rotation of the drive shaft for biasing the cylindrical elastic body towards the root ends of the two shafts and up to the radially projecting part which forms a stop. (4) when the top end of the freely rotatable shaft is tilted and the drive shaft is turned in the desired direction determined in (3) above, respectively, the cylindrical elastic body biases reliably and stably towards the root ends of the two shafts. This biasing is caused by two effects; one due to the biasing tendency intrinsic to the cylindrical elastic body, and one due to the rotation of the cylindrical elastic body in one specific direction with the top end of the freely rotatable shaft being tilted out of the plane defined by the freely rotatable shaft and the drive shaft or at least in the direction vertical to said plane.

Since, as shown in FIG. 5(*a*) and FIG. 5(*b*) herein, the top end of the freely rotatable shaft 30 is tilted, with the root end thereof being the pivotal point, at least in the transverse direction relative to the plane defined by the initial position of the freely rotatable shaft 30 and the drive shaft 10, the difference $\delta$ between the inter-shaft lengths of the cylindrical elastic body A at the root end and the top end is extremely small relative to the case of the conventional method in which, as shown in FIG. 7(*a*) and (*b*), the top end of the tension shaft 30' is tilted relative to the drive shaft 10 so that the top end of the tension shaft 30' moves away from the drive shaft 10 in the same plane. Thus almost no tension will act on the cylindrical elastic body A. (5) With the cylindrical elastic body being reliably biased towards the root ends of the two shafts as described in (4) above, the cylindrical elastic body is sequentially cut by a knife at desired intervals from the top end side towards the root end side; thus the cylindrical elastic body is sliced into rings of a desired width. As the process proceeds, the length (width) of the cylindrical elastic body in the axial directions of the two shafts will get shorter stepwise. However, since the biasing action of the cylindrical elastic body itself described in (4) above and the biasing action generated by the rotation of the cylindrical elastic body in a specific direction with said body being tilted at least in a direction transverse to the plane defined by the freely rotatable shaft 30 and the drive shaft 10, reliably biases the cylindrical elastic body towards the root end side of the two shafts and against the stop, cutting by the cutter will be effected reliably all the time. Furthermore, since the difference in the inter-shaft distances along the two shafts is small and almost no tension works on the cylindrical elastic body, the body will be sliced into ring-shaped elastic bodies of the desired width with high precision. FIG. 6 is a flow chart showing the procedure for tilting the freely rotatable shaft in the vertical direction according to the method of slicing into rings of the present invention described above.

BRIEF DESCRIPTION OF THE DRAWINGS

The invention will be better understood from the following detailed description taken in conjunction with the accompanying drawings wherein:

FIG. 5(*b*) is a right side view of the apparatus of FIG. 5(*a*);

FIG. 7(*a*) is a plan view schematically showing an apparatus used in the prior art method;

FIG. 7(*b*) is a right side view of the apparatus of FIG. 7*a*);

FIG. 8 is a flow chart showing the procedure of the prior art method of slicing into rings.

FIG. 11(*a*) shows the relationship for regular rotation and FIG. 11(*b*) for reverse rotation.

DETAILED DESCRIPTION OF THE INVENTION

FIG. 1 through FIG. 4 illustrate an embodiment of the apparatus according to the present invention.

Figure 1:
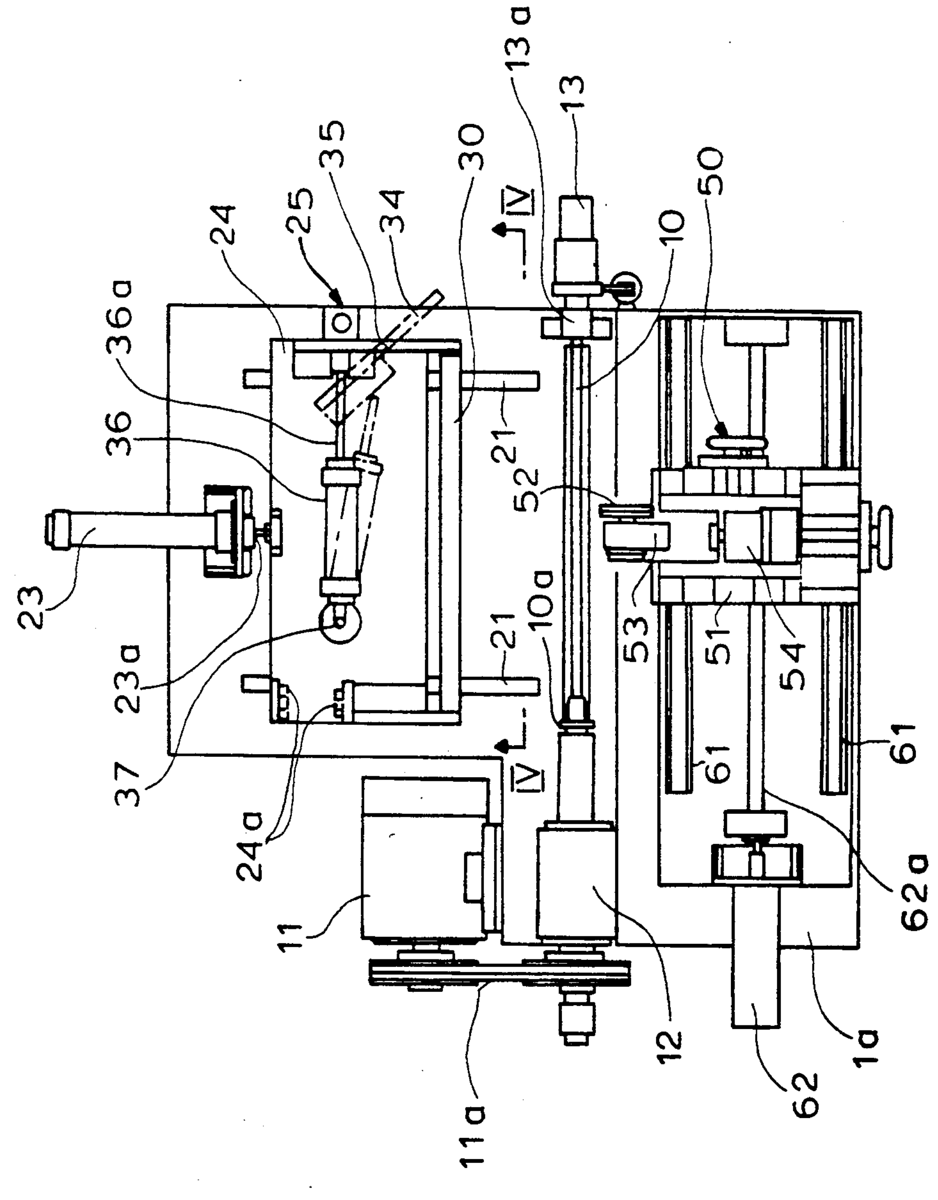
FIG. 1 is a plan view showing a preferred embodiment of apparatus for slicing a slab into rings according to the present invention.

As shown in FIG. 1, on a horizontal frame or bed 1 are arranged a drive shaft 10 extending in a horizontal direction, a freely rotatable shaft 30 extending in parallel with the drive shaft 10 in the horizontal direction, and a cutter unit 50 which is parallel to the drive shaft 10.

The drive shaft 10 is arranged approximately in the middle along the longitudinal direction of the bed 1, the shaft 10 extending in the transverse direction of the bed 1. The root end (on the left-hand side of the drawing) of the drive shaft 10 is rotatably mounted in a housing 12 and is rotated by a drive unit 11 and a drive belt 11*a*. A flange 10*a* is fixed to the root end of the drive shaft 10, the flange 10*a* forming a stop and being engaged by an edge of the slab as it is being cut. The top end (the right-hand side of the diagram) of the drive shaft 10 is supported by a rotatable bearing 13*a*. The bearing 13*a* is mounted on a cylinder unit 13 that supports the rotatable bearing 13*a* in such a way that the bearing 13*a* can be extended or retracted along the length of the shaft 10. The cylinder unit 13 is fixed on the top end (upper end) of a cylinder rod 14*a* (FIG. 2) of a hydraulic cylinder unit 14 such as a pneumatic cylinder so that the cylinder unit 13 can be raised or lowered. Thus the top end of the drive shaft 10 is freed by first moving the bearing 13*a* away from the top end of the drive shaft 10 in the axial direction of the shaft 10, and then by lowering the bearing 13*a*. The root end (lower end) of the cylinder unit 14 is fixed onto the side wall of the bed 1.

On the rear portion of the bed 1 are arranged a pair of rails 21 extending in a direction perpendicular to the drive shaft 10. A support stand 22 (FIG. 4) is mounted on the rails 21 so that the stand 22 can travel along the rails 21. A hydraulic cylinder unit 23 (FIGS. 1 and 3) for moving the stand 22 (FIG. 3 and FIG. 4) is provided on the rear portion of the bed 1, and the top end of the piston rod 23*a* facing the drive shaft 10 is fixed to the support stand 22. The support stand 22 travels towards the drive shaft 10 when the piston rod 23*a* is extended.

Figure 4:
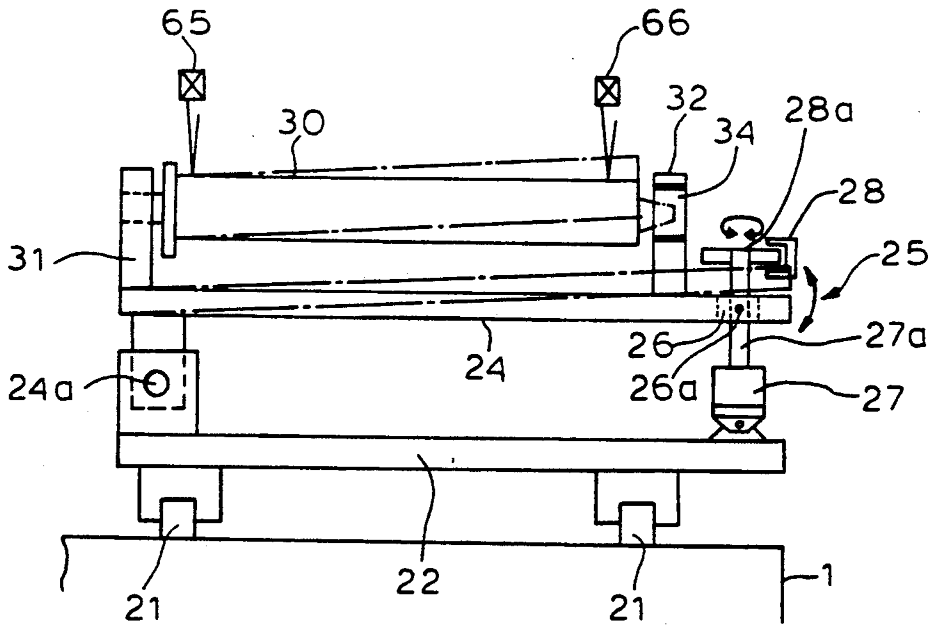
FIG. 4 is an enlarged view along the line IV—IV of FIG. 1.

One end (the left-hand side of FIG. 4) of the support plate 24 is pivotally supported by a pivotal shaft 24*a*, and the other end of the support plate 24 is arranged so that the plate 24 can be tilted in a vertical direction (see FIG. 4). A tilting unit 25 for tilting the other end of the support plate 24 in the vertical direction is provided between the support plate 24 and the support stand 22. A structure shown in FIG. 4 may be used as this tilting unit 25. In the structure, a plate 24 and the support stand 22. A structure shown in FIG. 4 may be used as this tilting unit 25. In the structure, a rotary plate 26 is supported on a shaft so that the plate 26 can be rotated in a vertical direction to the support plate 24, and the lower end of a servomotor 27 is pivotally supported on the support stand 22, the servomotor 27 having a threaded shaft 27*a* that screws into a threaded hole 26*a* formed in the center of the rotary plate 26. A rotary disc 28*a* is fixed to the top end of the threaded shaft 27*a* so that the number of turns of the rotary disc (and in turn of the threaded shaft 27*a*) can be detected by a pulse encoder 28; this allows the support plate 24 to be positioned in the horizontal or any desired tilted position. A hydraulic cylinder unit having a threaded shaft 27*a* may be used in place of the servomotor.

Figure 3:
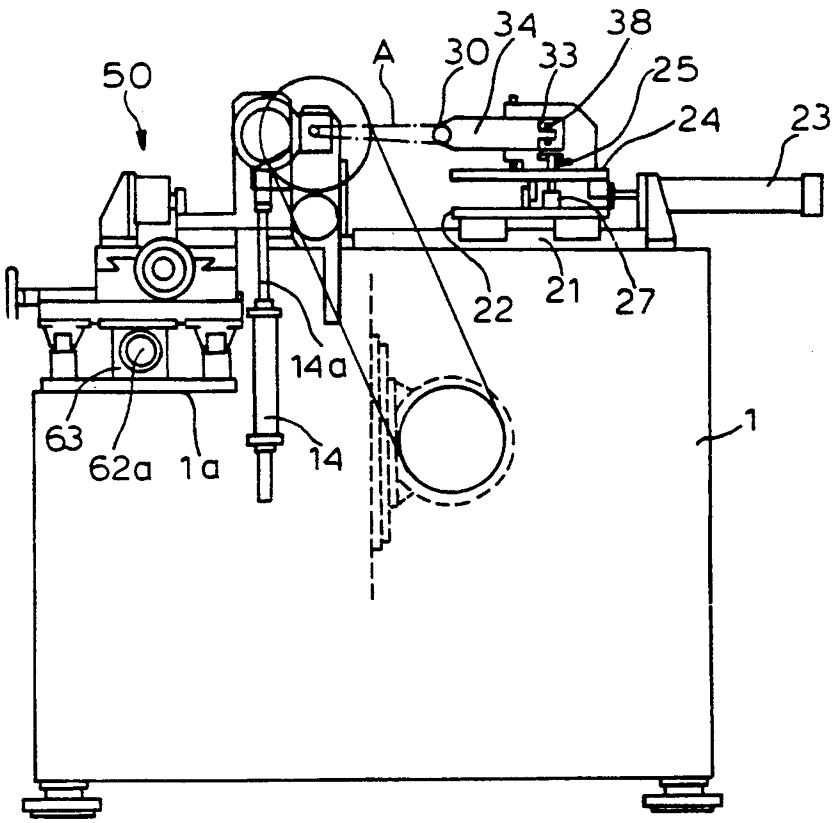
FIG. 3 is a right side view of the apparatus of FIG. 1.

Extending forwardly from both ends of the support plate 24 are supporting frames 31 and 32, and one end of the freely rotatable shaft 30 is rotatably mounted on the front end of the support frame 31. The other support frame 32 is provided with a long groove 33 of which the front end is open. A portion of a support member 34 (FIGS. 1 and 3) is loosely inserted in the long groove, and the member 34 is supported near its center by a vertical shaft 35 so that the support member 34 can be turned horizontally. On the support plate 24 are pivotally supported the root end of the hydraulic cylinder unit 36 by a vertical shaft 37, the hydraulic cylinder unit extending in parallel with the freely rotatable shaft 30. The outer end of the cylinder rod 36*a* of the cylinder unit 36 is pivotally supported on the rear end of the support member 34 by means of a vertical shaft 38 (FIG. 3). With this arrangement, when the cylinder rod 36*a* is extended or withdrawn as shown in FIG. 1, the support member 34 will rotate horizontally. When the cylinder rod 36*a* is extended close to the maximum, the front end of the support member 34 will contact the other end of the freely rotatable shaft 30, and will support the other end of the freely rotatable shaft 30 via a bearing member (not illustrated).

The cutter unit comprises a main body 51, a rotary blade 52, and a drive motor 53 for turning the rotary blade 52. The rotary blade 52 is mounted together with the drive motor 53 on the main body 51 in such a way that the rotary blade 52 can be brought close to or away from the drive shaft 10 in a direction perpendicular to the shaft 10. The main body 51 is also provided with a feed unit 54 for bringing the rotary blade 52 together with the drive motor 53 close to or away from the drive shaft 10.

On a one-step-lower front portion 1*a* of the bed 1 are provided a pair of parallel rails 61 which extend in the transverse direction, and the cutter unit 50 is mounted on the rails 61, in such a way that the cutter unit 50 can travel along the rails 61. A servomotor 62 for shifting the cutter unit 50 is mounted on one end of the front portion 1*a* of the bed 1. The servomotor 62 is provided with a threaded shaft 62*a*, and the threaded shaft 62*a* is screwed into a female screw part 63 (FIG. 3) provided in the bottom of the main body 51. When the threaded shaft 62*a* is rotated, the cutter unit 50 will be shifted in the transverse direction.

In FIG. 4, numerals 65 and 66 denote sensors which are arranged above the freely rotatable shaft 30 at points spaced from the middle point of the shaft 30 on both the right and left sides by a certain distance from the middle point. The distance between both the sensors 65 and 66 corresponds to the width of a slab A.

The following is an explanation of the method for slicing a slab A into belts of a constant width by means of the foregoing apparatus.

Figure 2:
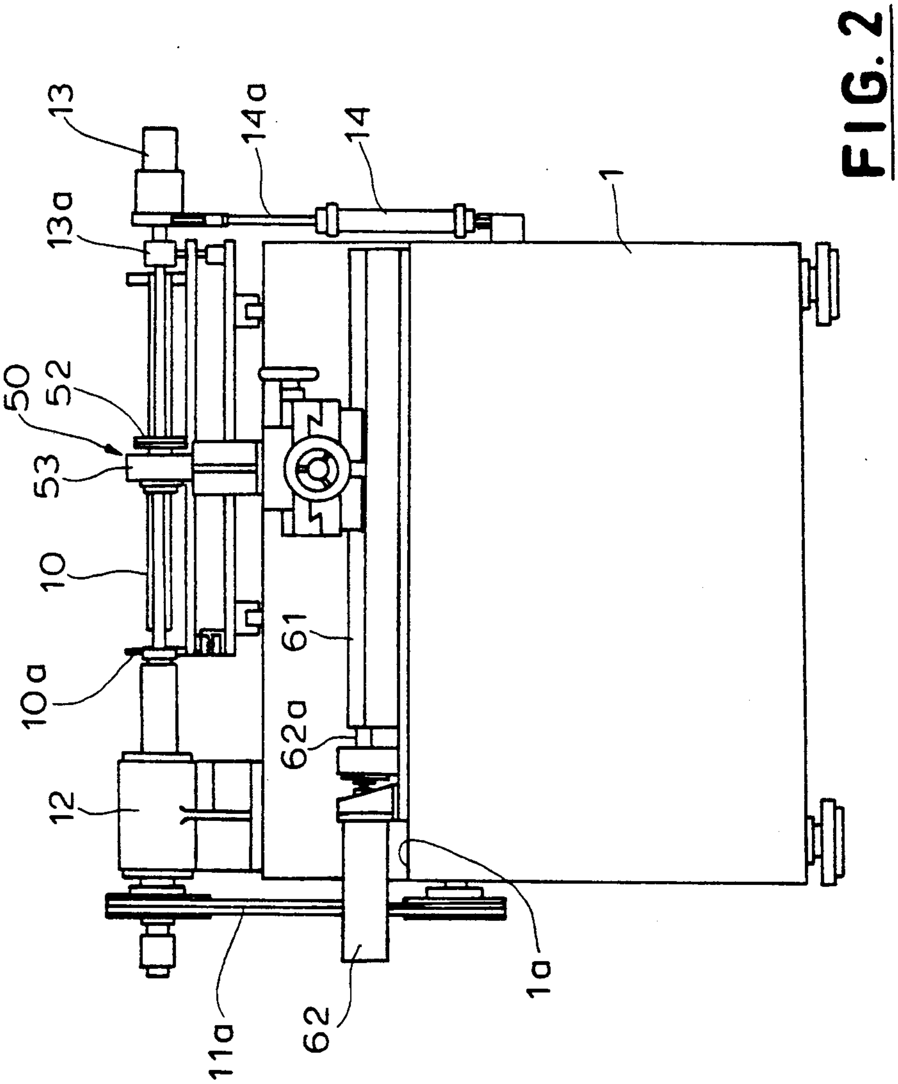
FIG. 2 is a front view of the apparatus of FIG. 1.

With reference to FIG. 1 through FIG. 3, first a slab A is placed across the drive shaft 10 and the freely rotatable shaft 30 which extend in parallel with each other. In doing so, the bearing 13*a* is separated from the top (the right-hand) end of the drive shaft 10 and then lowered by the cylinder unit 14. Then the support member 34 is horizontally rotated counterclockwise (FIG. 1) by the cylinder unit 36 to move the top end of the support member 34 away from the top end of the rotatable shaft 30. Thus with both top ends of the shafts 10 and 30 being released or exposed, the slab A is placed across the shafts 10 and 30. Next, the bearing 13*a* and the support member 34 are restored to their original positions to close both top ends of the shafts 10 and 30. The support stand 22 is shifted rearwardly by the cylinder unit 23 to move the freely rotatable shaft 30 away from the drive shaft 10 and give an appropriate tension to the slab A so that when the drive shaft 10 is rotated the slab A rotates together with the drive shaft 10. Note that the slab A is positioned across both the shafts 10 and 30, in the central position of the shafts (see FIG. 3), in such a way that both ends of the slab A are at the positions of the aforementioned sensors 65 and 66, respectively.

Figure 5A:
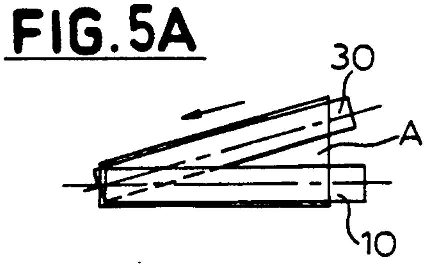
FIG. 5(*a*) is a front view schematically showing the apparatus according to the present invention.
Figure 5B:
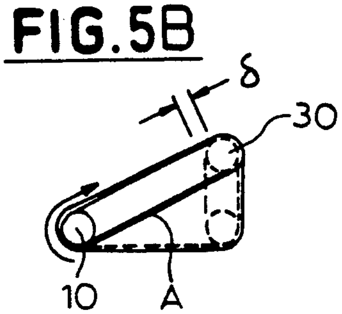
Figure 6:
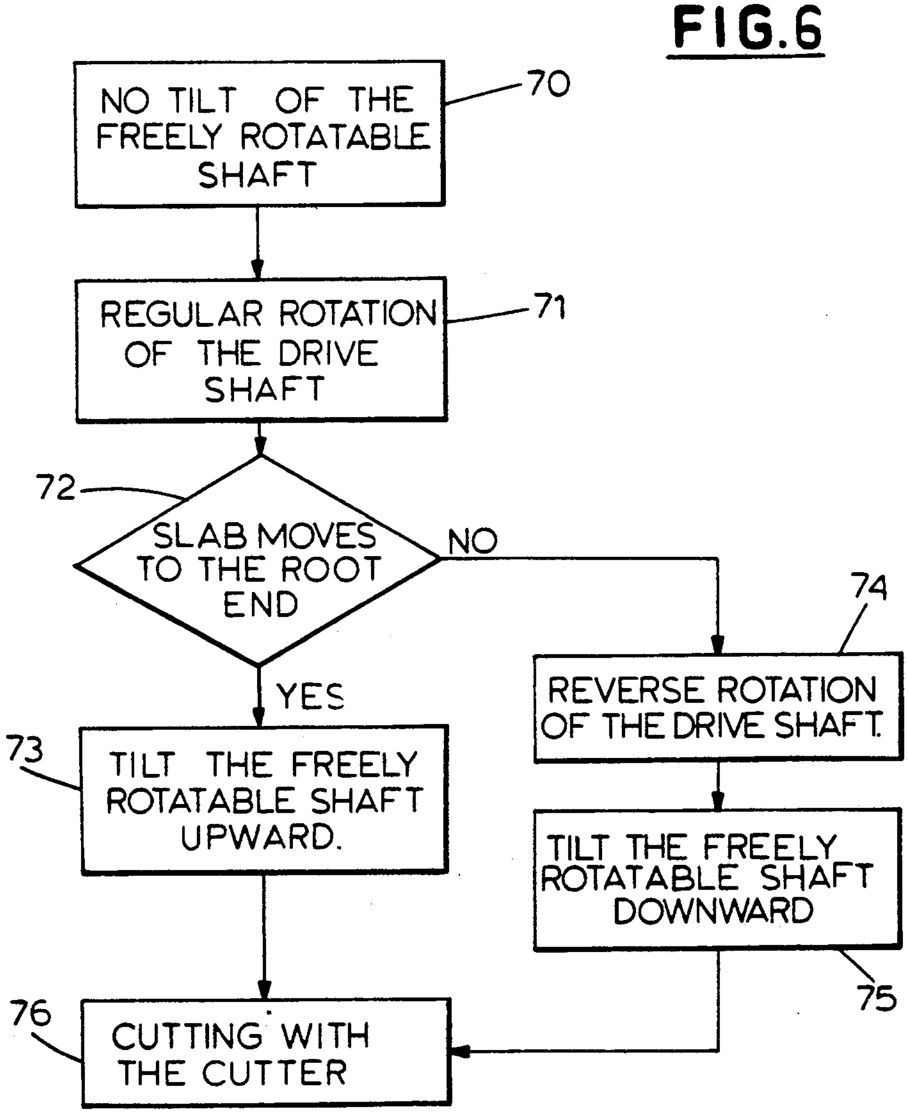
FIG. 6 is a flow chart showing the procedure for tilting the freely rotatable shaft in the vertical direction according to the method of the present invention.

Second, and with reference to FIGS. 5, 5(*a*) and 5(*b*), discussed above the slab is mounted on the shafts and initially the freely rotatable shaft 30 is not tilted (step 70 of FIG. 6). Then (Step 71) the drive shaft 10 is rotated clockwise (regular rotation) as seen in a direction from the top end thereof towards the root end thereof, by the drive unit 11. Under this condition, the slab A will rotate and tend to shift towards the top end side or the root end side on the two shafts 10 and 30. The direction of this shift will be detected by one of the sensors 65 and 66 (Step 72). Thus the inherent biasing tendency of the slab A itself is detected.

Third, according to the biasing tendency inherent in the slab A, the direction of rotation of the drive shaft A is decided; when the slab A is biased towards the root end side of the shafts 10 and 30 (the left-hand side of FIG. 1) with the regular rotation of the drive shaft 10, the direction of rotation of the drive shaft 10 is decided to be the regular rotation, and the tilting direction of the top end of the freely rotatable shaft 30 is decided to be upward (Step 73). In contrast, when the slab A tends to move towards the top end side of the two shafts 10 and 30 (the right-hand side of FIG. 1), the rotational direction of the drive shaft is decided to be the reverse rotation (Step 74), and the tilting direction of the top end of the freely rotatable shaft 30 is decided to be downward (Step 75).

Fourth, when the directions decided in the third step above are realized, for example, in the case of a slab A having a biasing tendency of the former tendency described above, when the top end of the freely rotatable shaft 30 is tilted upward and the drive shaft 10 is rotated regularly, the slab A will be reliably and stably biased towards the root ends of the two shafts 10 and 30. The slab will move towards the root ends of the shafts and will engage the stop or flange 10*a*, where it will reliably remain during the cutting operation. Note that tilting upward of the top end of the freely rotatable shaft 30 is effected by turning the tilting unit 25 or the servomotor 27 in a specified direction to lift upward one end of the support plate 24. The number of turns of the rotary disc 28*a* being turned by the servomotor 27 is measured by means of the pulse encoder 28 so that the one end of the support plate 24 is raised to the desired height relative to the horizontal plane (normally about 10 mm for a slab of which the circumference is from 63 to 132 mm).

Fifth, with the slab A being securely biased towards the root ends of the two shafts 10 and 30 as described above, the slab A is sliced (Step 76) into rings by the cutter unit 50 at regular intervals from the top end side of the slab A towards the root end side thereof to form belts of a desired width. The rotary blade 52 is shifted by a certain distance (corresponding to the desired width of the ring or belt) from the top end side of the slab A towards the root end side thereof. Then the rotary blade 52 is turned by the drive motor 53 and fed towards the drive shaft 10 by the feed unit 54 to cut into the slab A on the drive shaft 10. In this way, a belt of the desired width is cut away from the slab A. Then, the rotary blade 52 is moved away from the slab A by the feed unit 54, and the servomotor 62 is turned by a desired number of turns to shift the cutter unit 50 along the rails 61 by a desired distance towards the root end side. Then the rotary blade 52 is turned again by the drive motor 53 and fed by the feed unit 54 towards the drive shaft 10 to cut into the slab A on the drive shaft 10. The above-mentioned operations are repeated to sequentially slice the slab A, from the top end side to the root end side, into a large number of belts of the desired width. After slicing the top ends of the two shafts are disengaged from their supports to permit removal of the cut belts and the mounting of another slab.

Figure 9:
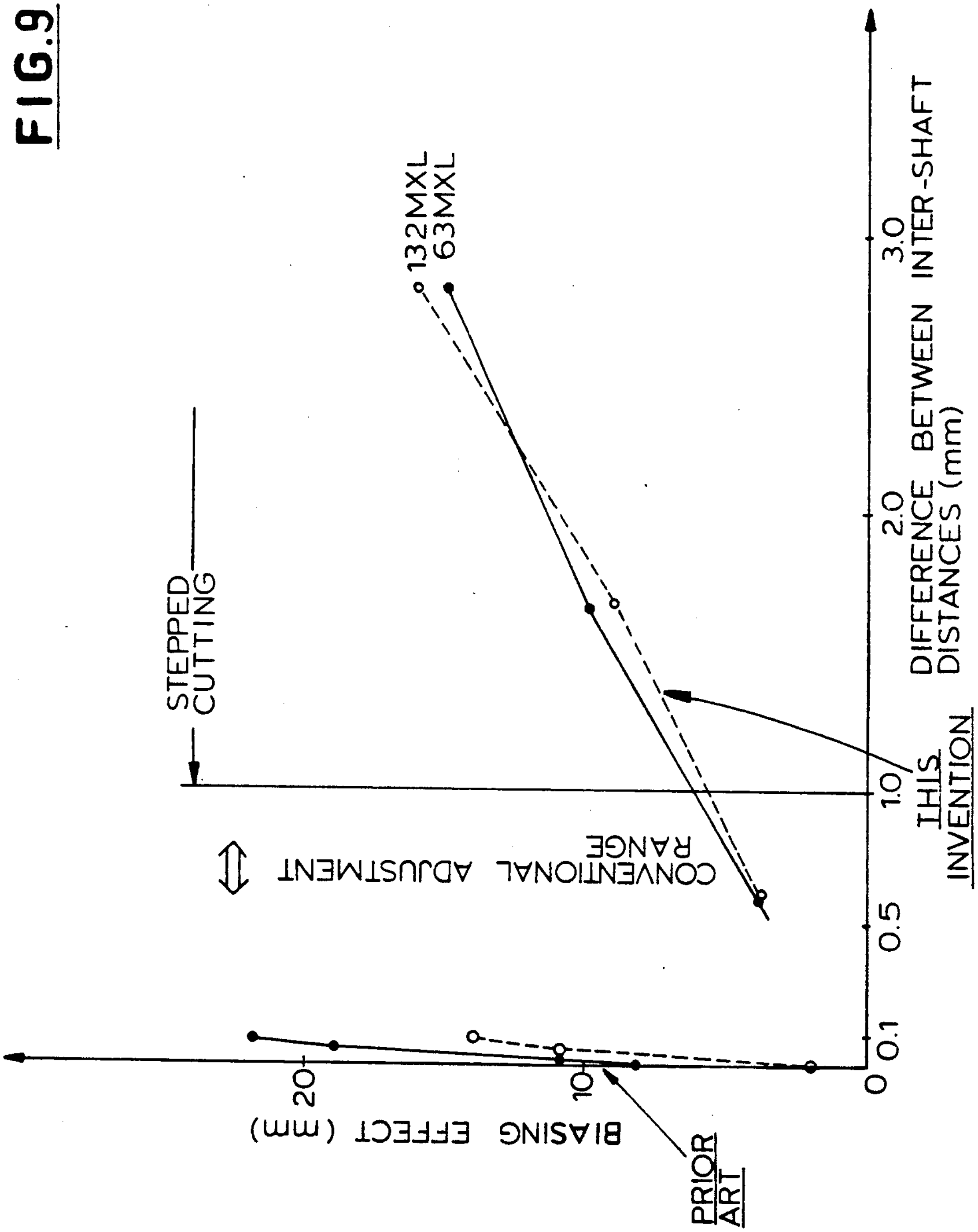
FIG. 9 is a diagram indicating the relationships between the biasing action and the difference in inter-shaft distances of the method according to the present invention and of the prior art method, respectively.

The diagram on the left-hand side of FIG. 9 shows a specific example of the biasing distance vs. the difference δ between the distances of the shafts at the top end side and the root end side for the slab A when the apparatus of the above-mentioned embodiment was used and a toothed belt with circumference of 63 mm (63 MXL) and a toothed belt with circumference of 132 mm (132 MXL) were spanned across the drive shaft 10 and the freely rotatable shaft 30 and the drive shaft 10 was rotated in the regular direction for a fixed time (15 seconds). The diagram on the right-hand side of FIG. 9 shows the biasing distance vs. the difference δ between the shafts at the top end side and the root end side for the slab A when a conventional apparatus is used and belts of the same kinds (63 MXL) and (132 MXL) were spanned and the drive shaft 10 was rotated for a fixed time (15 seconds). The comparison of the left-hand diagram and the right-hand diagram of FIG. 9 demonstrates that the method for slicing into rings and its apparatus according to the present invention exhibits an excellent biasing effect without giving an excessive tension to the slab A.

Figure 10:
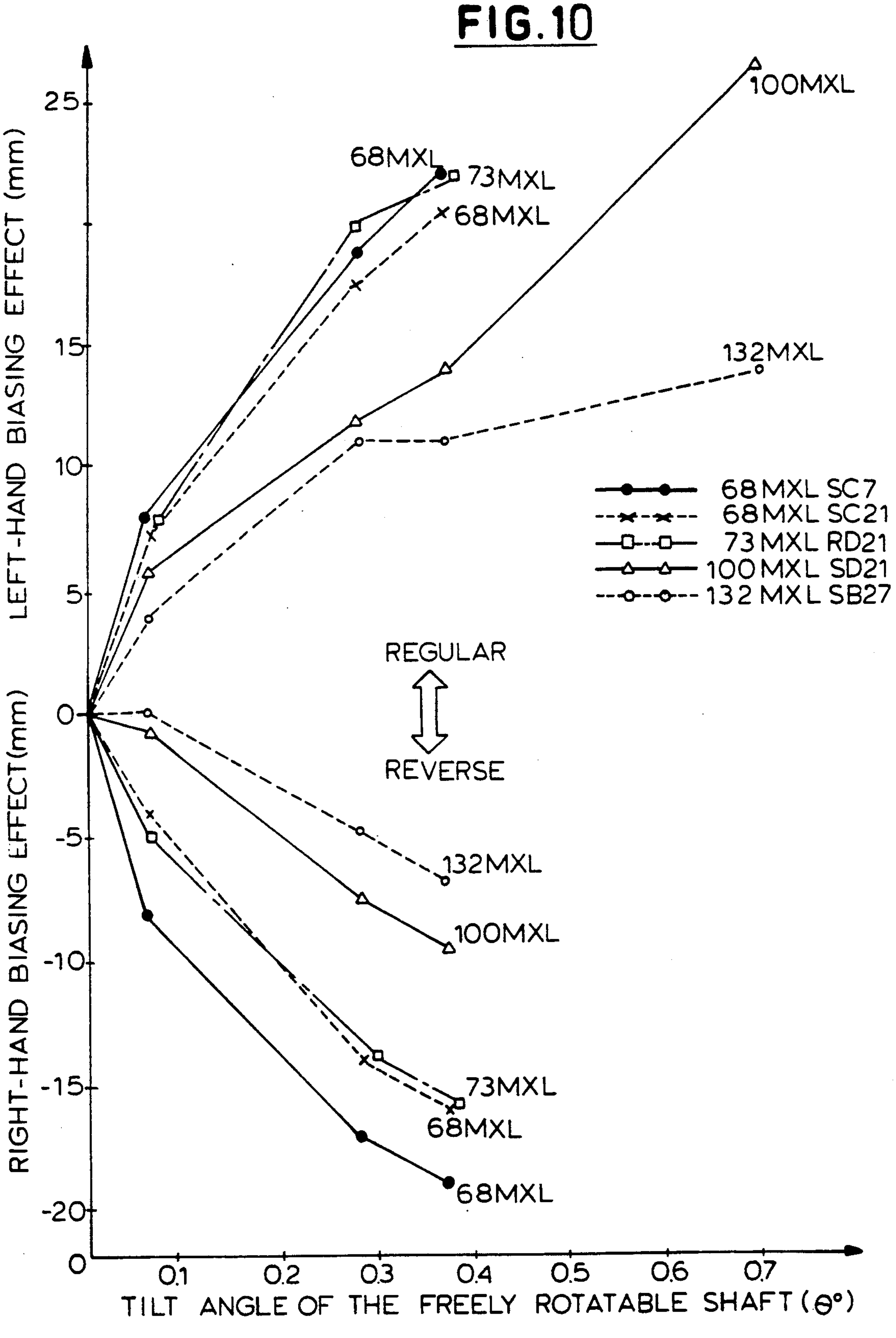
FIG. 10 is a diagram indicating the relationship between the biasing action (mm) and the tilting angle ($\theta°$) of the freely rotatable shaft according to the method of the present invention.
Figure 11A:
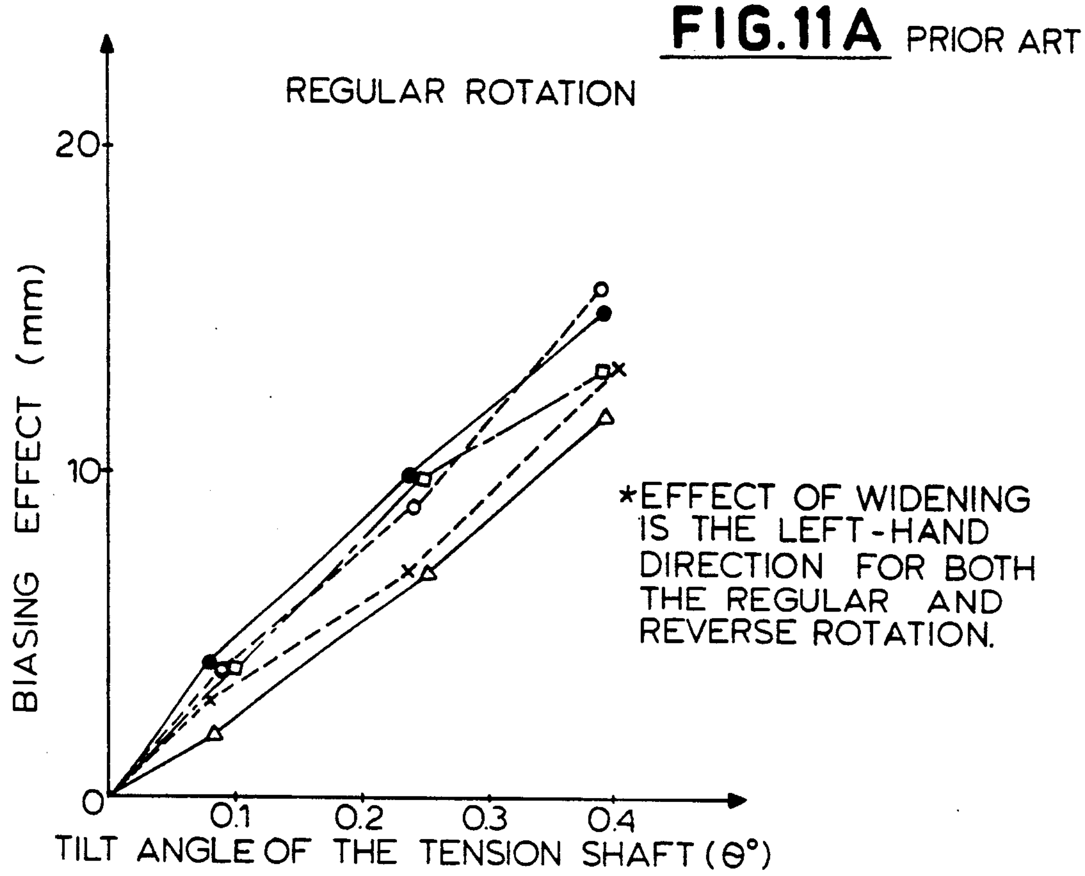
FIG.11A PRIOR ART
FIG. 11(*a*) and FIG. 11(*b*) are diagrams showing the relationship between the biasing action (mm) and the tilting angle ($\theta$) for tension according to the prior art method.
Figure 11B:
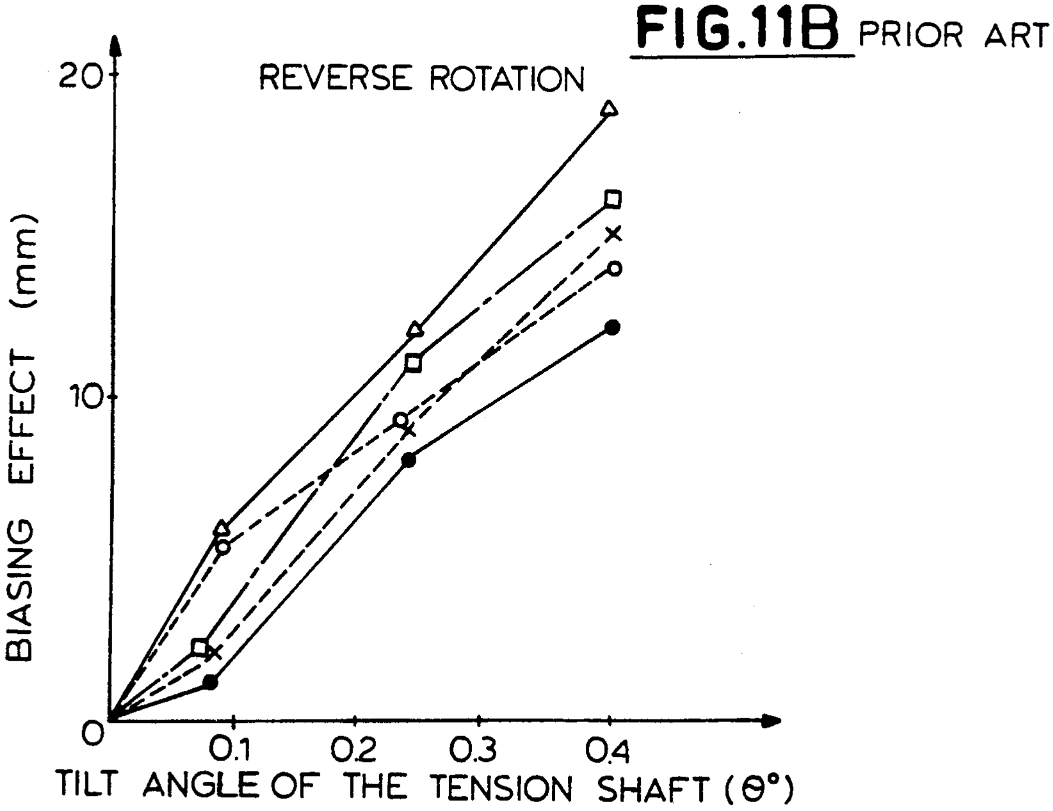
FIG.11B PRIOR ART

FIG. 10 is a diagram indicating the relationship between the biasing effect and the tilt angle of the freely rotatable shaft 30 when the apparatus of the above-mentioned embodiment (the present invention) was used and various slabs of different sizes were biased. The upper portion of the diagram shows the experimental results for slabs A which showed a tendency to bias towards the root (left-hand) end when the drive shaft 10 was rotated regularly with two shafts 10 and 30 running in parallel to each other. On the other hand, the lower portion of the diagram shows the experimental results for slabs A which showed a tendency to bias towards the top (right-hand) end when the drive shaft 10 was rotated regularly with the two shafts 10 and 30 running in parallel to each other; in the experiments of which the results are shown in Diagram 10, the top end of the freely rotatable shaft 30 was tilted downward and the drive shaft 10 were reversely rotated.

In the above-mentioned embodiment, the top end of the freely rotatable shaft 30 is tilted only in the vertical direction (the direction which is transverse to the initial plane of the two shafts). It, however, is possible to tilt the shaft 30 not only in the vertical direction but also in the horizontal direction (direction to move away from the drive shaft 10) to give a certain amount of tension to the top end side of the slab A and bias the slab A. In this case, the slab A will be biased to one side by the combination of three effects; the biasing effect due to the inherent biasing tendency of the slab A itself, the biasing effect due to the rotation of the slab A in a specific direction, and the biasing effect due to a tension given to the top end side of the slab A.

Furthermore, in the above-mentioned embodiment, the drive shaft 10 and the freely rotatable shaft 30 are initially arranged parallel to each other in a horizontal plane, but the present invention is applicable to the drive shaft 10 and the freely rotatable shaft 30 both being parallel to each other and tilting on one end side in a plane. The present invention is also applicable to slice cylindrical elastic bodies other than slabs into rings of a constant width.

As will be clear from the explanation above, the present invention has the following advantages or effects:

The method for slicing into rings according to the present invention, in comparison with the conventional method, has the following advantages:

(1) The biasing effect is larger;

(2) When the freely rotatable shaft is tilted by about the same amount as the conventional tension shaft, the distance between the shafts at the top end and the root end of the cylindrical elastic body are substantially smaller;

(3) The tension working on the cylindrical elastic body is small; and (4) The adjustable range of biasing of the cylindrical elastic body is wider.

With such effects, the method according to the present invention is capable of reliably and stably biasing the cylindrical elastic body to one side of the two shafts. This in turn eliminates defective cutting such as stepped cutting and allows slicing into elastic rings of a desired width with high precision.

What is claimed is:

1. A two-shaft apparatus for slicing a cylindrical elastic body into rings, said apparatus comprising a drive shaft and a drive unit, said drive shaft having a top end thereof and a root end thereof which is connected to said drive unit, said drive shaft having a radially projecting part at said root end, said drive unit being reversible whereby said drive shaft may be rotated in a regular direction or in a reverse direction, a freely rotatable shaft spaced from said drive shaft having a root end which is pivotably mounted and having a top end which can be tilted in a direction which is transverse of said plane, said top end being tiltable in both directions from said neutral plane, and a cutting unit which has a cutter positioned perpendicular to the axial direction of said drive shaft, which is movable towards said drive shaft and is adjustable in the axial direction of said drive shaft, and further including a pair of sensors positioned adjacent one of said shafts, said sensors being spaced apart a distance which is substantially the same as the width of said elastic body, said sensors being responsive to one edge of said elastic body for determining movement of said elastic body.

* * * * *